(12) United States Patent
Nose et al.

(10) Patent No.: US 7,164,502 B2
(45) Date of Patent: Jan. 16, 2007

(54) IMAGE PROCESSING METHOD, AND IMAGE PROCESSOR AND STORAGE MEDIUM THEREOF

(75) Inventors: Masaki Nose, Kawasaki (JP); Jun Moroo, Kawasaki (JP); Kazuhiko Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1000 days.

(21) Appl. No.: 09/795,449

(22) Filed: Mar. 1, 2001

(65) Prior Publication Data

US 2002/0039199 A1 Apr. 4, 2002

(30) Foreign Application Priority Data

Sep. 29, 2000 (JP) .............................. 2000-299360

(51) Int. Cl.
*H04N 1/40* (2006.01)

(52) U.S. Cl. .................... 358/3.03; 358/3.05; 382/237

(58) Field of Classification Search ................ 358/1.9, 358/3.03–3.06, 3.09, 3.14–3.15; 382/237, 382/272, 251–252

See application file for complete search history.

(56) References Cited

U.S. PATENT DOCUMENTS

| 5,014,333 A | * | 5/1991 | Miller et al. ................ 382/252 |
| 5,050,000 A | * | 9/1991 | Ng .............................. 358/3.03 |
| 5,610,999 A | * | 3/1997 | Bannai et al. .............. 382/272 |
| 6,203,133 B1 | | 3/2001 | Tanaka et al. |
| 6,369,912 B1 | | 4/2002 | Kumashiro |

FOREIGN PATENT DOCUMENTS

| JP | 6-189119 | 7/1994 |
| JP | 8-307690 | 11/1996 |
| JP | 9-23334 | 1/1997 |
| JP | 9-46522 | 2/1997 |
| JP | 11-215376 | 8/1999 |

* cited by examiner

*Primary Examiner*—Thomas D. Lee
*Assistant Examiner*—Stephen Brinich
(74) *Attorney, Agent, or Firm*—Armstrong, Kratz, Quintos, Hanson & Brooks, LLP

(57) ABSTRACT

The present invention relates to an image processing method using the error diffusion method to prevent jumps in a highlight part and darkening in a shadow part at high resolution. The image processing method comprises a step of calculating an average value of density values of N×M (N, M>1) pixels, a step of adding the average value and a diffused quantization error value, a step of quantizing the addition result with a predetermined number of tones, a step of selecting a quantization pattern corresponding to the quantization result, and a step of calculating the diffused quantization error value from the quantization error. The error diffusion algorithm has flexibility in outputting dots. In other words, error diffusion processing is performed in N×M pixel units, and a plurality of quantization patterns are provided, and a quantization pattern is selected based on the quantization result. Therefore jumps in a highlight part and smears in a shadow part can be prevented, the tone maintenance characteristic unique to the error diffusion can be satisfied, and a smooth and sharp image can be obtained.

9 Claims, 17 Drawing Sheets

FIG. 3A    Densitiy Level <255/8
FIG. 3B    255/8<=Densitiy Level <255*3/8
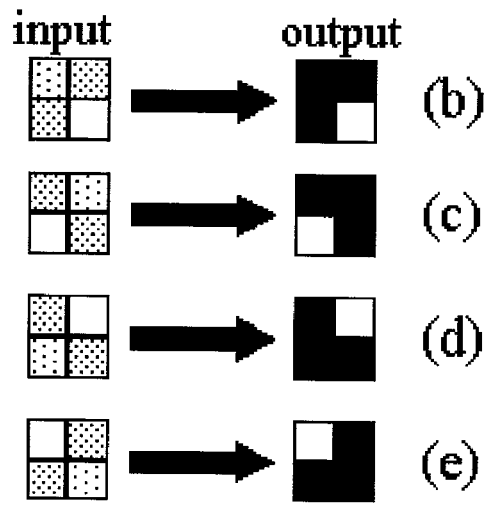
FIG. 3C    255*3/8<=Densitiy Level <255*3/4
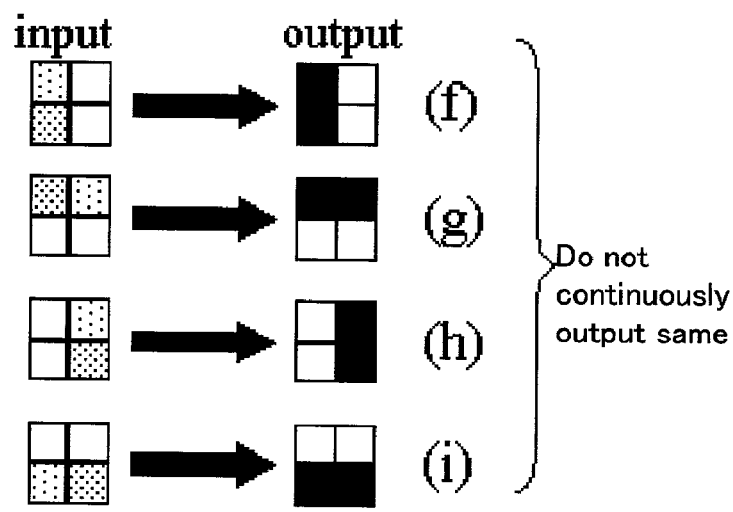
Do not continuously output same
FIG. 3D    255*3/4<Densitiy Level
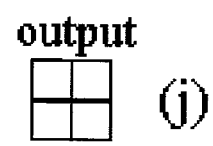

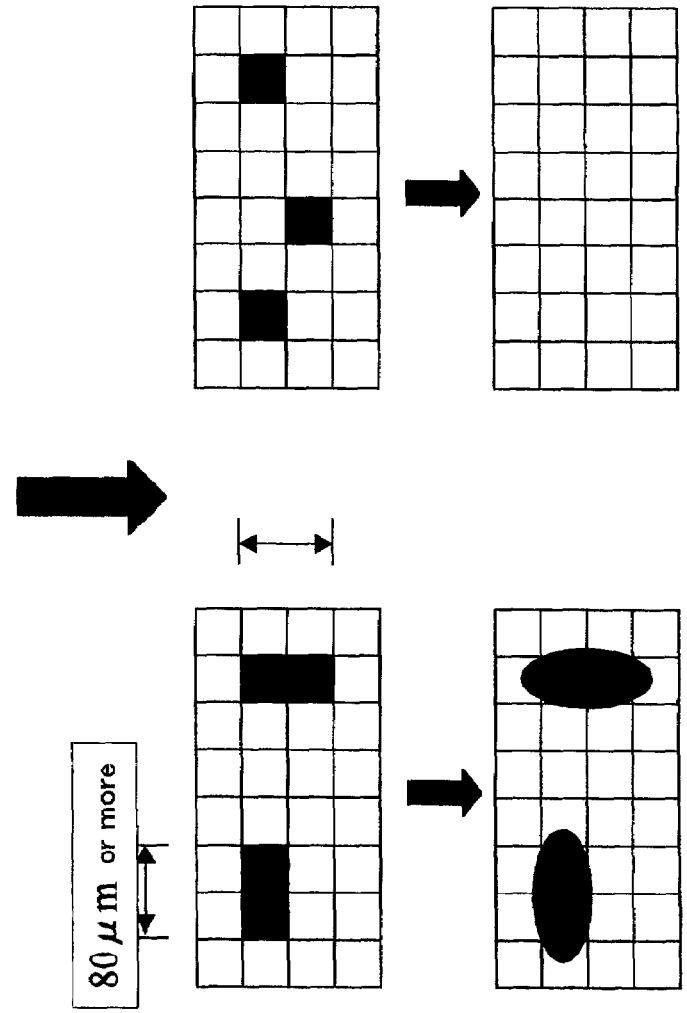
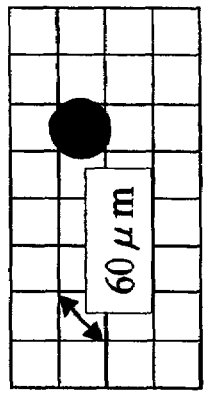
FIG. 13

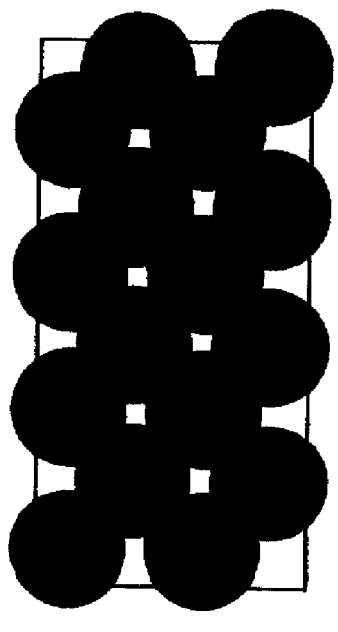
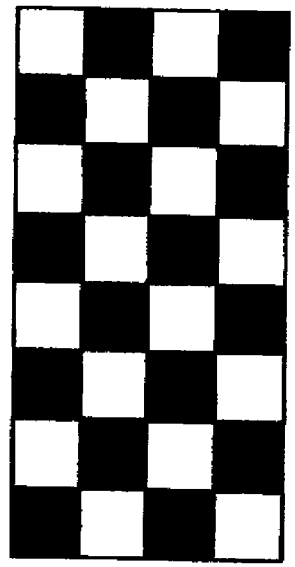
FIG. 14 Prior Art

1 Dot        4 Dot

Shadow Part        Mid Tone
~Mid Tone(Line Type)        ~Light Part
                                            (Conventional Screen Type)

Error Diffusion Method

Line Screen Method

IMAGE PROCESSING METHOD, AND IMAGE PROCESSOR AND STORAGE MEDIUM THEREOF

BACKGROUND OF THE INVENTION

1. Field of the Invention

The present invention relates to an image processing method to output high quality half tone images in a device where dot output is unstable, and an image processor and storage medium thereof, and more particularly to an image processing method for performing high image quality processing using the error diffusion method, and an image processor and storage medium thereof.

2. Description of the Related Art

Recently half tone representation is demanded for a printer that outputs images by ON/OFF dots. Standard printers now can be classified into an inkjet type and an electro-photographic type, and algorithms for creating images are different depending on the printer type. In an inkjet printer, half tone images are generally created by the error diffusion method, and in an electro-photographic printer, half tone images are mainly created by the systematic dither method.

The error diffusion method uses an algorithm to obtain half tone images that maintain tone representation by diffusing a quantization error, which is generated when an input image is quantized by the number of tones possible by the output device, into peripheral pixels. Since this is serial processing in one pixel units, the output image excels in resolution, tone reproducibility and sharpness of the edges compared with other screening algorithms. Also dots are output at random, so moire is not generated. In the case of the systematic dither method, on the other hand, processing time is faster since only a comparison of the dither (threshold) matrix and input pixels is sufficient, but the quality of output images is not as good as the error diffusion method.

Unlike a system which ejects ink on paper, such as an inkjet type, the electro-photographic type creates a latent image by electrostatic force before attaching toner. Therefore the processing capability to perform electric control greatly influences the quality of images. It has been said that the error diffusion method, which can generate high quality output images, is not suitable for electro-photographic type half tone processing. The reason will be described with reference to FIG. 12 to FIG. 14.

FIG. 12 is a conceptual diagram of dot reproduction of an electro-photograph, FIG. 13 is a diagram depicting dot creation at a highlight part of the image, and FIG. 14 is a diagram depicting dot creation at a shadow part of the image. In FIG. 12, dot reproduction at 600 dpi and 300 dpi are compared as an example in the electro-photographic system. Here, the electro-photographic printer 100 in FIG. 12 can easily reproduce dots at 300 dpi, since one pixel can be created by a plurality of dots, a large latent image can be created, and electric force is strong. In other words, mid-tone representation is possible, and smooth images can be output.

A pixel size is halved at double resolution, 600 dpi. For example, as FIG. 13 shows, an isolated dot at 600 dpi is about 60 µm in size (=dot pitch 42.3 µm×root2). However, a dot diameter where toner adheres stably is about 4 times the drum film thickness. In a general electronic photograph, the drum film thickness is 20–30 µm, so a dot diameter where toner adheres stably is 80 µm. Therefore about 60 µm of dots will be unstable in size. The dots can be reproduced if the dots are next to each other, but an isolated dot where there are no nearby dots may not be reproduced.

Particularly in the error diffusion method where a quantization error is dispersed into peripheral pixels, isolated dots tend to be generated. Therefore, at 600 dpi, highlight tends to be reproduced at a density that is thinner than the desired density, and when dots increase, density suddenly increases and a high contrast image is generated, as FIG. 12 shows. In other words, mid-tone representation is difficult.

As FIG. 14 shows, in the case of the error diffusion method, dot distribution becomes checkers when a 50% area percentage is reproduced. Normally the dot diameter is set to root2 times of the dot pitch so that a diagonal line becomes continuous, so the checkers become almost solid (all black) when printed. Also the position of toner shifts by a process factor, such as toner-transfer process, and the white area where toner does not exist becomes narrower. Therefore density saturates when the area percentage is about 50%.

This error diffusion method was developed when standard printers were 300 dpi, where there were no problems since isolated dots are reproduced at 300 dpi, however, as resolution increases, a "jump" in the highlight part and the reproduction of the shadow part become problems. For these reasons, in a system where the stable creation of latent images becomes difficult as resolution increases, such as the case of an electro-photograph, half tone processing based on the error diffusion method has been inappropriate, and the dither method, where dot output can be controlled at will, has been normally used.

As a method to compensate dot reproduction when resolution increases, the following three methods have been proposed.

(1) A method of spreading isolated dots; As FIG. 15 shows, isolated dots are spread at output to prevent a tone jump in the highlight part (for example, Japanese Patent Application Laid-Open No. H10-19697).

(2) A method of switching screening between a shadow to mid-tone and a mid-tone to highlight; As FIG. 16 shows, quantization processing by line screen is performed from the shadow part to mid-tone, and dots are spread and output by gradually dropping the dot cycle to ½ from the mid-tone to highlight part (for example, Japanese Patent Application Laid-Open H8-156329).

(3) Error diffusion method considering dot gain;

This is an improved error diffusion method, including a prediction formula of dot gain in the algorithm of error diffusion, to reproduce a more accurate density and to prevent darkening in the shadow part (for example, U.S Pat. No. 5,087,981).

With the above conventional methods, however, the following problems occur.

(1) In the case of the first conventional method, an area where dots are spread and an area where dots are not spread coexist since the area is in proportion to the tone level, as shown in FIG. 17, so as a side effect of spreading isolated dots, tone reproduction may be reversed in a photograph. In other words, isolated dots can be reproduced correctly by spreading, but a density reversal occurs between one dot, which was spread, and four dots, which were not spread, as shown in FIG. 15 and FIG. 17, for example.

(2) In the case of the second conventional method, tone can be reproduced very well by switching the screens. However, in characters with low density, details, such as edges, become unclear, and the density maintenance of an output image and the clarity of edges become problems because the screen is rough, as shown in FIG. 18A, compared with the output images by the conventional error diffusion method shown in FIG. 18B.

(3) In the case of the third conventional method, density is reproduced, including the prediction formula (degree) of dot gain in the algorithm of error diffusion, so as to prevent dot gain generation and darkening in the shadow part, as shown in FIG. 19. Since the algorithm considers preventing an increase of density due to dot gain, darkening in the shadow part can be prevented by this method, but the probability of isolated dots appearing in the highlight part increases, which makes it difficult to generate dots in the highlight part.

SUMMARY OF THE INVENTION

With the foregoing in view, it is an object of the present invention to provide an image processing method and an image processor and storage medium which can prevent jumps in a highlight part and darkening in a shadow part, can satisfy the tone maintenance characteristic unique to the error diffusion, and can obtain a smooth and sharp image.

It is another object of the present invention to provide an image processing method and an image processor and storage medium thereof to allow good half tone representation even for a device which dot creation is unstable.

It is still another object of the present invention to provide an image processing method and an image processor and storage medium thereof which allows giving flexibility of dot output to the error diffusion algorithm, satisfies the tone maintenance characteristic unique to the error diffusion, and obtains a smooth and sharp image.

To achieve these objects, an image processing method for performing image processing using the error diffusion method according to the present invention comprises a step of calculating an average value of density values of N×M (N, M>1) pixels, a step of adding the average value and a diffused quantization error value, a step of quantizing the addition result by a predetermined number of tones, a step of selecting a quantization pattern corresponding to the quantization result, and a step of calculating the diffused quantization error value from the quantization error.

In order to output high resolution images by electro-photography where dots are unstable, a method of intentionally controlling dot patterns, such as the systematic dither method, is suitable, and such an algorithm as the error diffusion method is not suitable since jumps in the highlight part and darkening in the shadow part are generated. However, compared with the systematic dither method, the error diffusion method excels in terms of resolution and tone reproducibility. So in the present invention, the error diffusion algorithm is includes flexibility in dot output. In other words, error diffusion processing is performed in N×M pixel units, and a plurality of quantization patterns are provided, and a quantization pattern is selected depending on the quantization result. Therefore jumps in the highlight part and darkening in the shadow part can be prevented, the tone maintenance characteristic unique to the error diffusion can be satisfied, and a smooth and sharp image can be obtained.

According to the image processing method of the present invention, it is preferable that the above mentioned step of selecting a quantization pattern comprises a step of calculating the density gradient in the N×M area, and a step of selecting a quantization pattern by the quantization result and the density gradient, so as to prevent the generation of texture.

According to the image processing method of the present invention, it is preferable that the above mentioned step of selecting a quantization pattern comprises a step of selecting a quantization pattern corresponding to the quantization result from a plurality of quantization patterns which do not include isolated dots, so that the generation of a pattern of isolated dots can be prevented, and the tone maintenance characteristic of the error diffusion method can be satisfied even at high resolution.

BRIEF DESCRIPTION OF THE DRAWINGS

FIGS. 3A, 3B, 3C and 3D are diagrams depicting the quantization-pattern in FIG. 1;

FIG. 13 is a diagram depicting a jump in a highlight part according to a prior art;

FIG. 14 is a diagram depicting dot reproducibility in a shadow part according to a prior art;

DESCRIPTION OF THE PREFERRED EMBODIMENTS

Embodiments of the present invention will now be described in the sequence of the first embodiment, second embodiment, third embodiment, and other embodiments, with reference to the accompanying drawings.

FIRST EMBODIMENT

Figure 1:
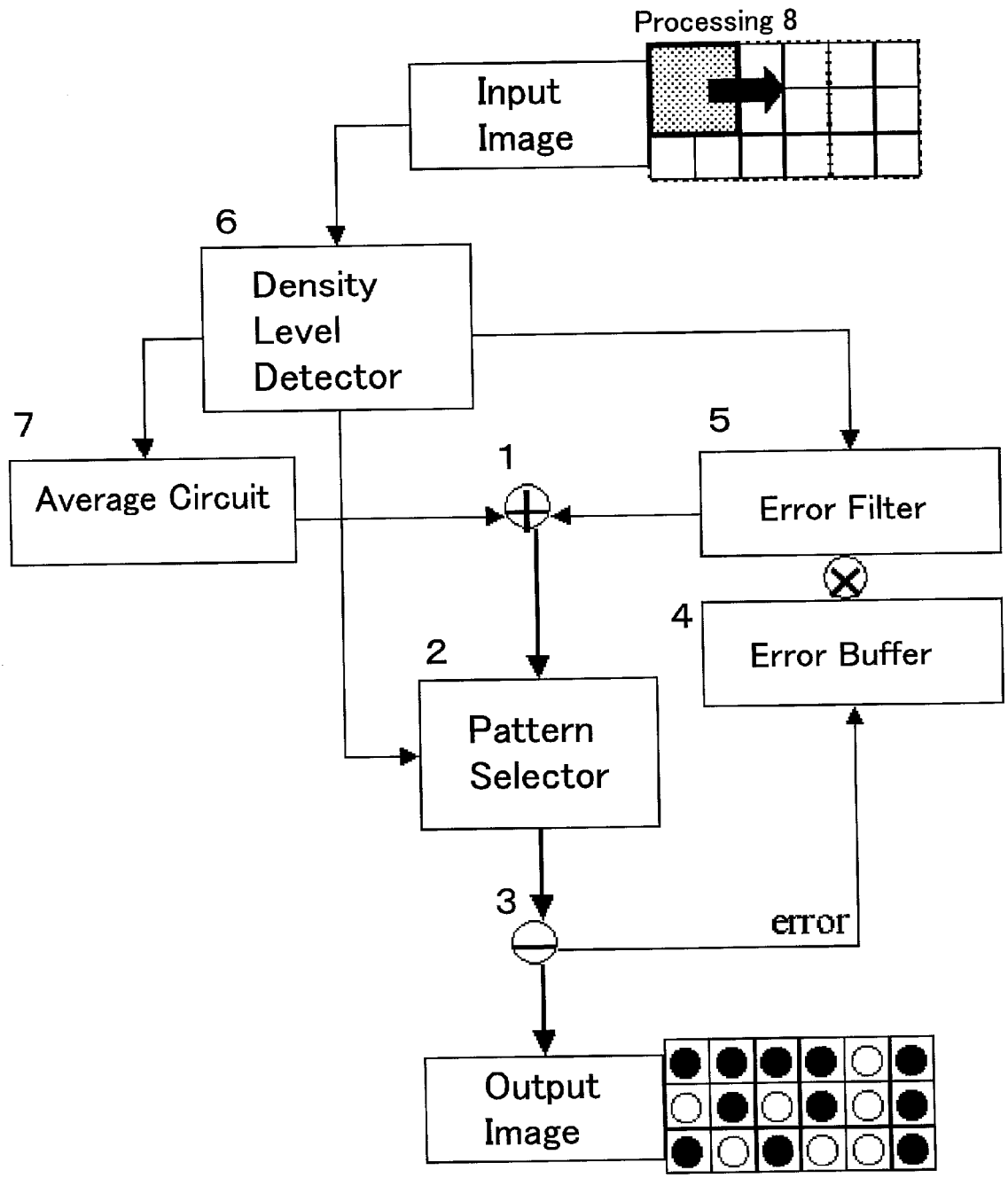
FIG. 1 is a functional block diagram of the first embodiment of the present invention.
Figure 2:
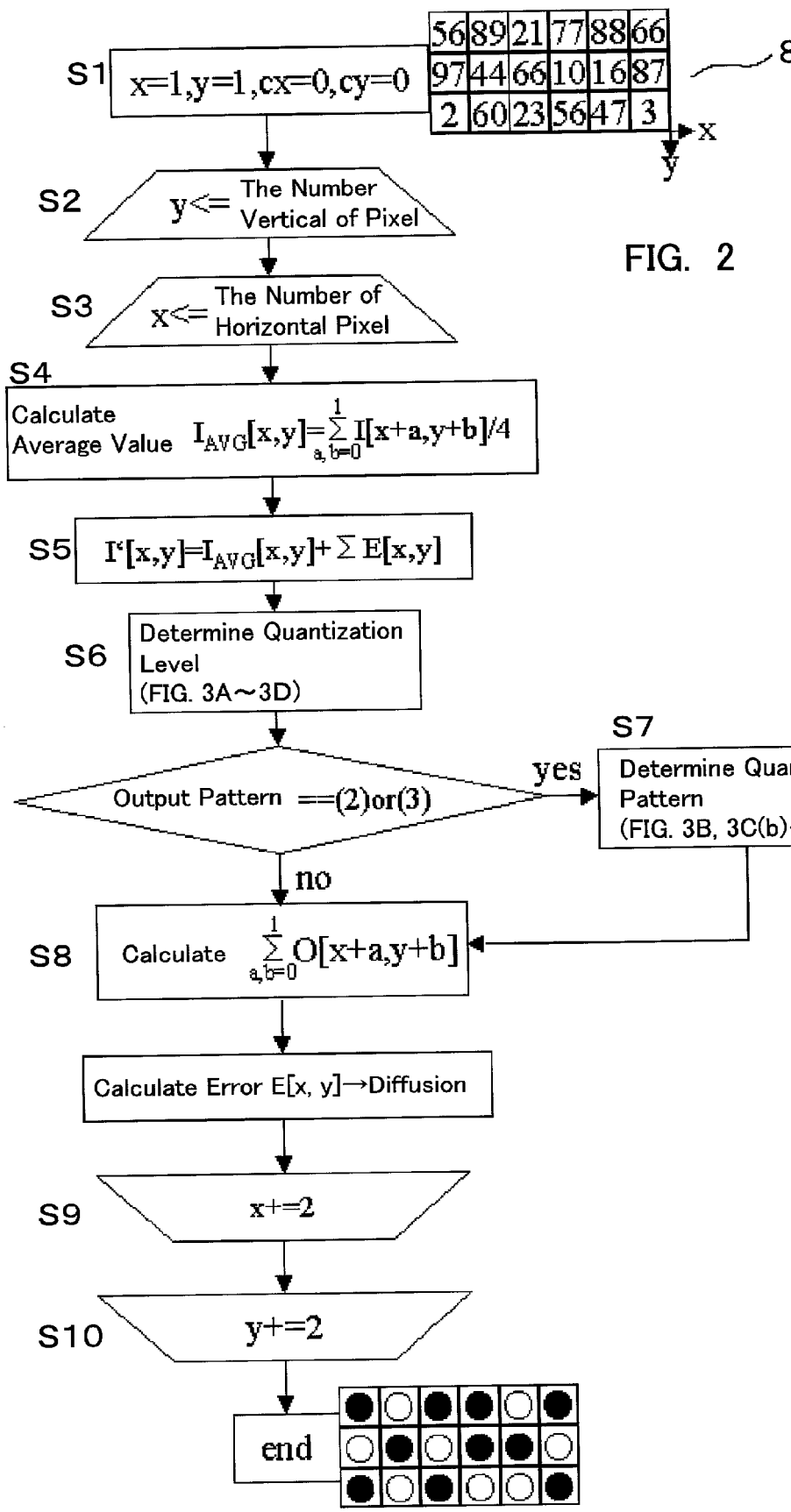
FIG. 2 is a processing flow chart of the first embodiment of the present invention.
Figure 4:
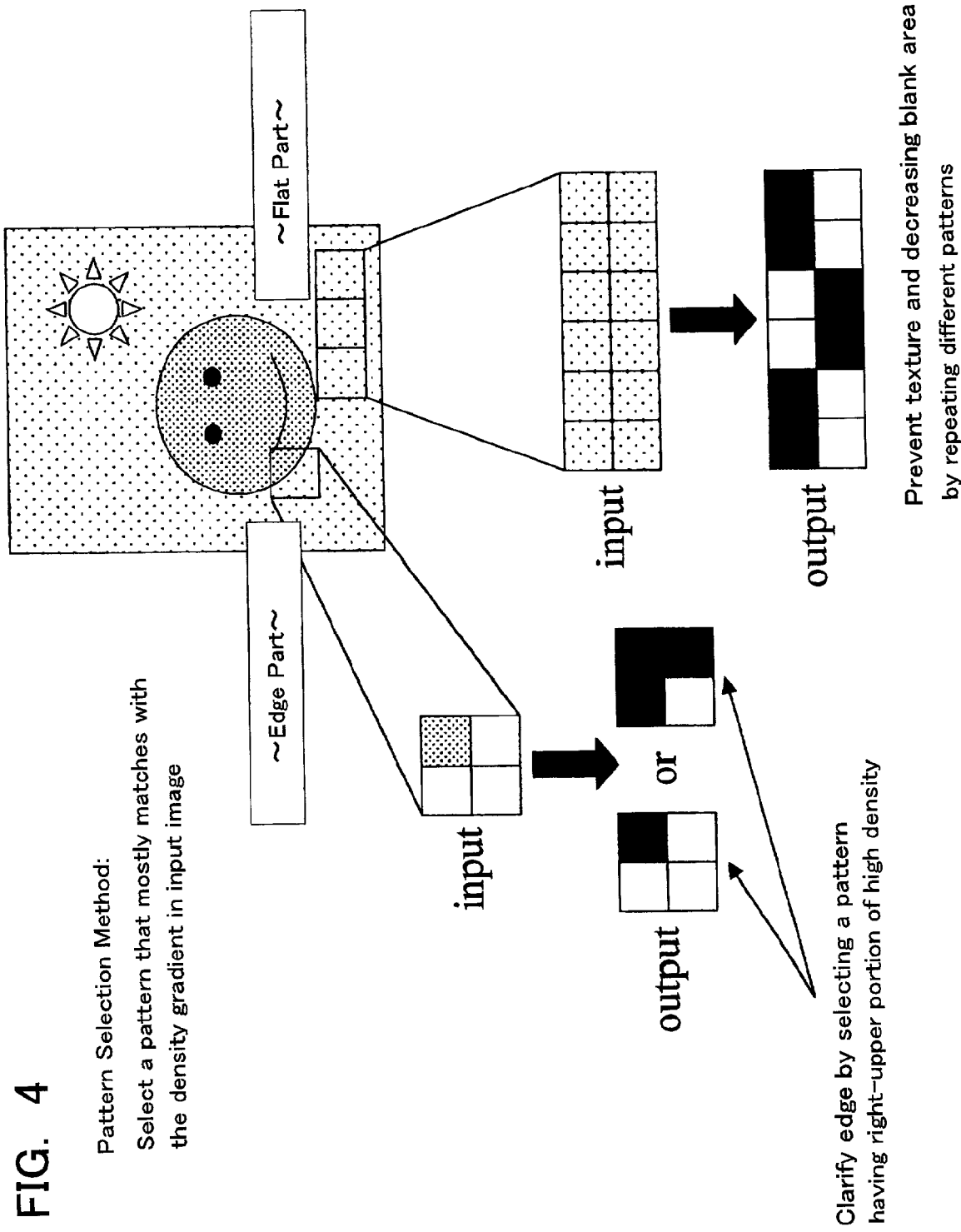
FIG. 4 is a diagram depicting the quantization-pattern selecting operation in FIG. 1.

FIG. 1 is a functional block diagram of an image processor of the first embodiment of the present invention, FIG. 2 is an image processing flow chart of the first embodiment of the present invention, FIGS. 3A, 3B, 3C and 3D are diagrams depicting select patterns of the first embodiment of the present invention, and FIG. 4 is a diagram depicting the pattern select processing in FIG. 3.

FIG. 1 is a functional block diagram of an image processor example where a 2×2 pixel group is one processing unit. In FIG. 1, the image buffer 8 stores input images. Here, the input image is a full color image where each one of RGB planes has 0–255 of 8 bit levels(0: black, 255: white) or YMCK planes.

The adder 1 adds the average value of 2×2 pixels and the quantization error determined by the error filter 5. The pattern select circuit 2 is a circuit to quantize the input value from the adder 1 by the quantization threshold value. The pattern select circuit 2 selects a suitable quantization pattern from the provided 2×2 quantization patterns (patterns in FIG. 3), considering the input value from the adder 1. The subtractor 3 calculates the quantization error. The error buffer 4 stores the quantization error. The error filter 5 is recorded the diffusion ratio of the error, and calculates the diffusion error by multiplying the quantization error of the error buffer 4 by the diffusion ratio.

The density level detection circuit 6 detects the values of the target pixel and the peripheral pixels in the input image of the image buffer 8. The equalization circuit 7 equalizes the pixel values in a 2×2 pixel range based on the values from the detection circuit 6.

Now the processing operation will be described according to the flow chart of the algorithm of the present invention in FIG. 2, with reference to the quantization patterns in FIGS. 3A, 3B, 3C and 3D.

Figure 12:
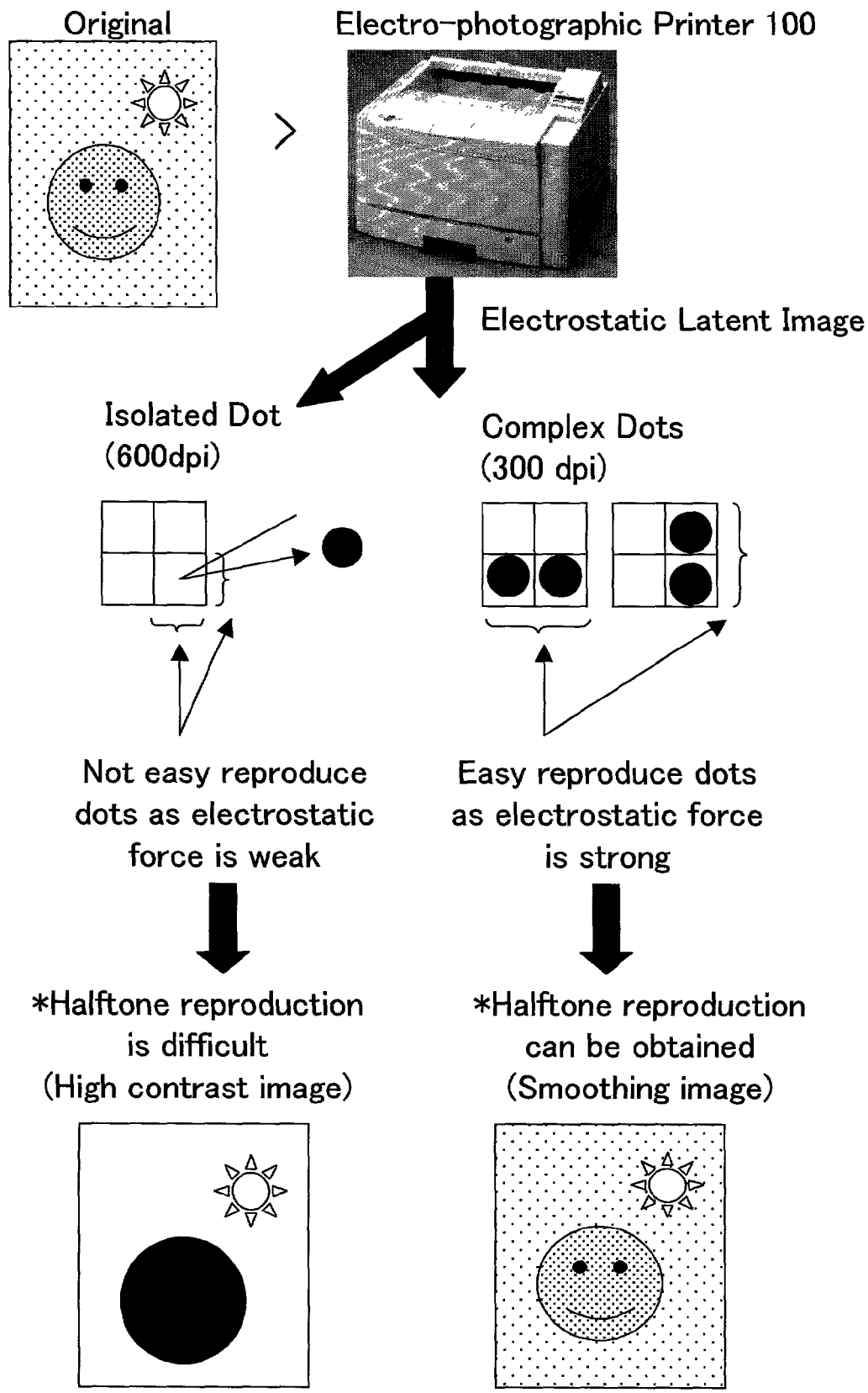
FIG. 12 is a diagram depicting dot reproducibility at high resolution.
Figure 15:
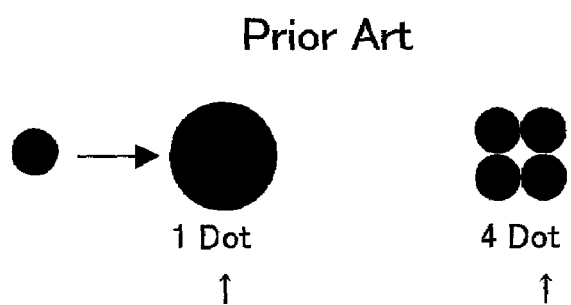
FIG. 15 is a diagram depicting a first prior art.
Figure 16:
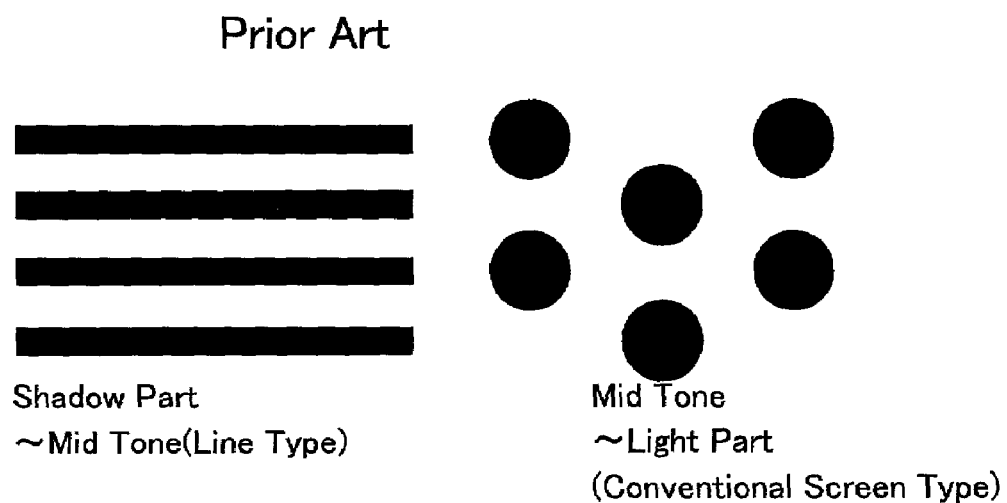
FIG. 16 is a diagram depicting a second prior art.
Figure 17:
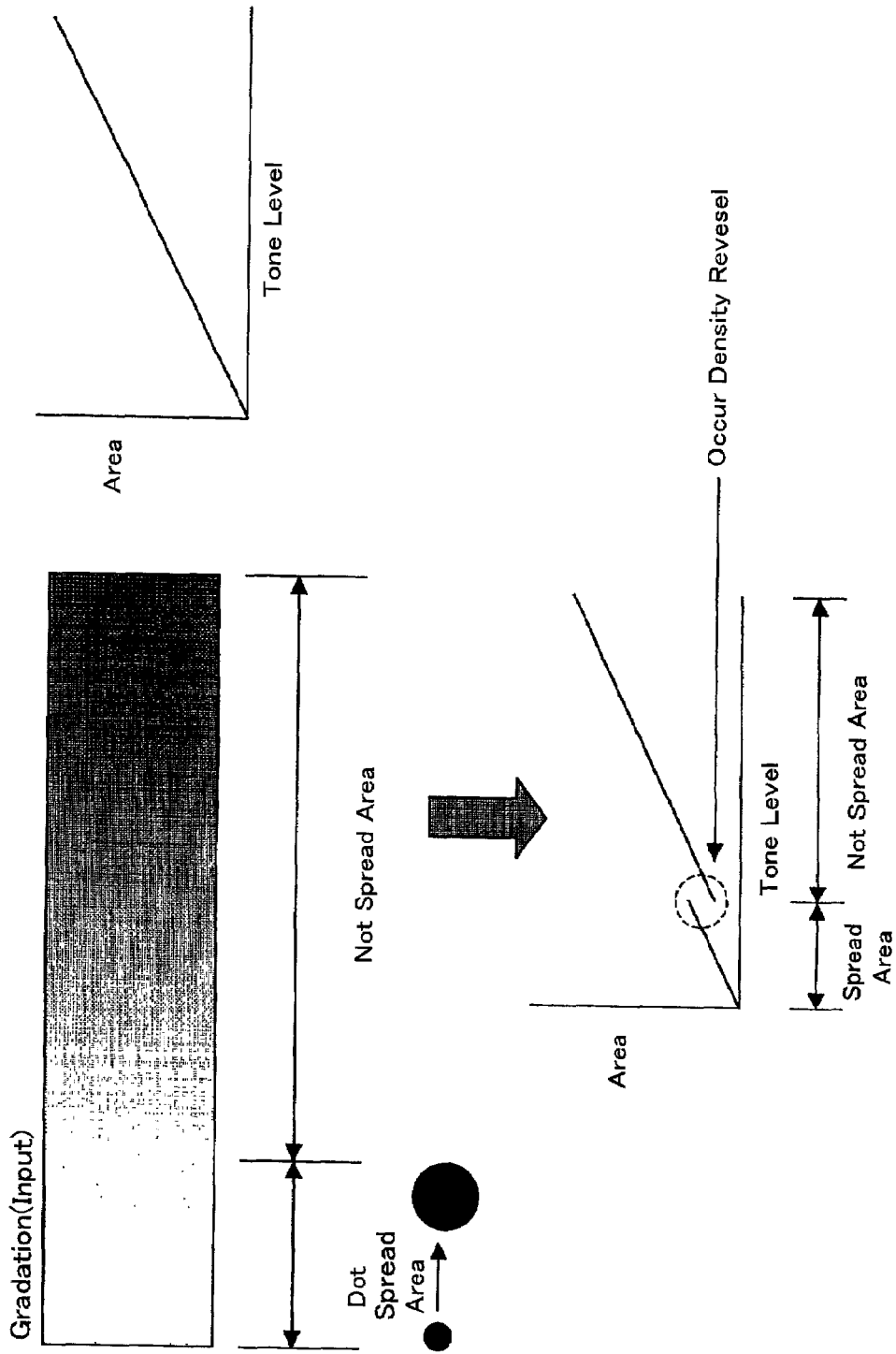
FIG. 17 is a diagram depicting a problem of the first prior art.
Figure 18B:
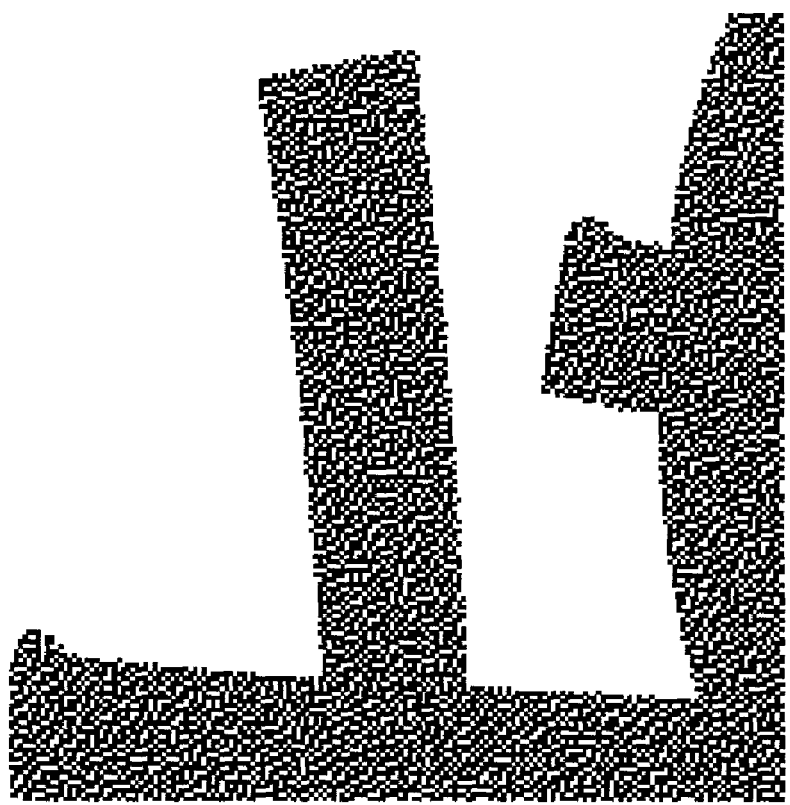
FIGS. 18A and 18B are diagrams depicting a problem of the second prior art.
Figure 18A:
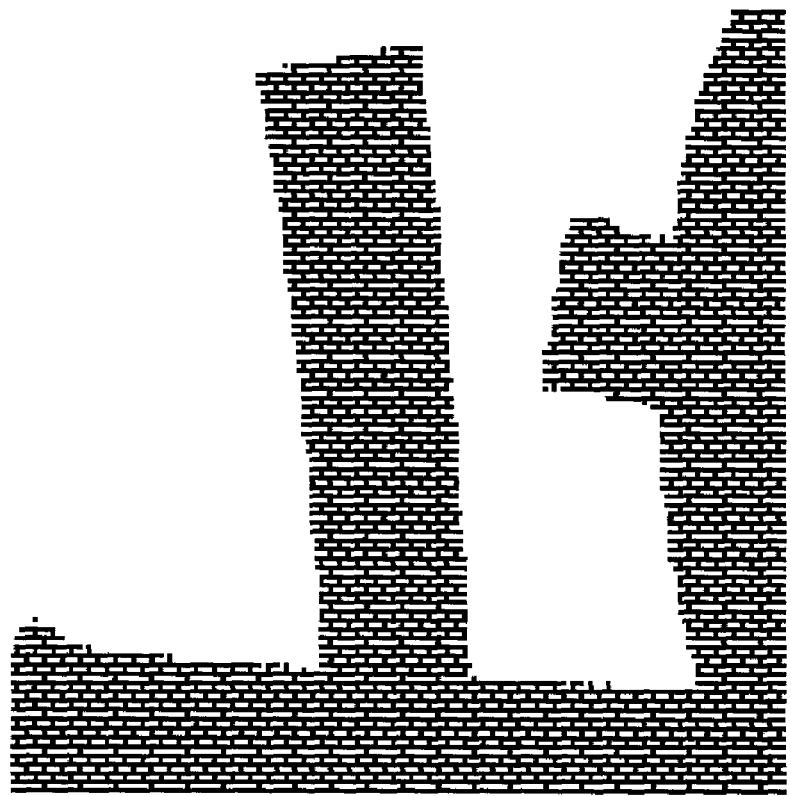
Figure 19:
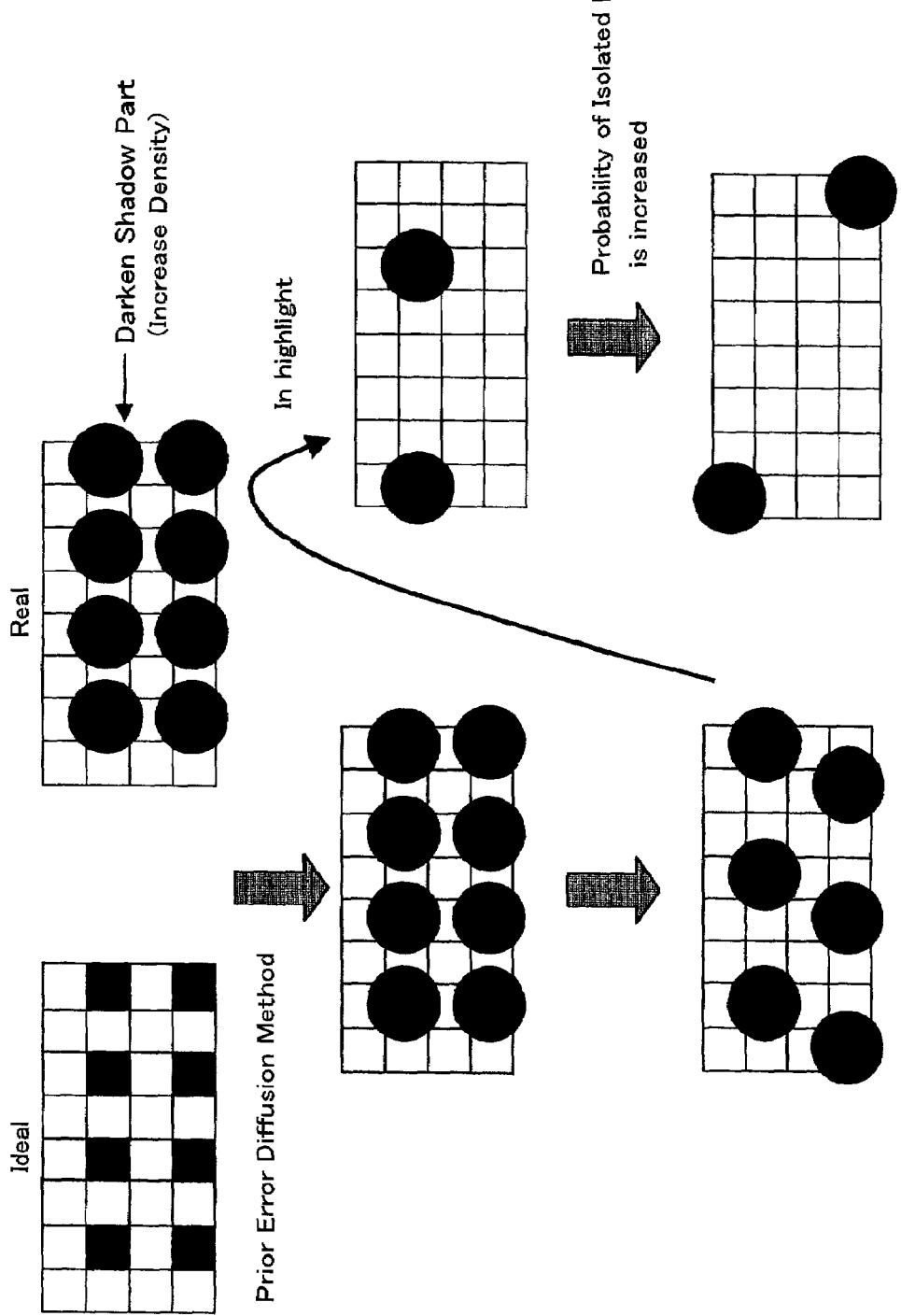
FIG. 19 is a diagram depicting a problem of the third prior art.

In this case, a suitable pattern is selected from the provided 2×2 output patterns shown in FIGS. 3A, 3B, 3C and 3D, considering the input values. Here it is assumed that a printer which cannot reproduce isolated dots at a certain resolution or higher, as shown in FIG. 12, is used, and that the printer cannot reproduce an isolated dot for one pixel of the input image.

So, considering that isolated dots cannot be output at that resolution, 0 dot pattern [j] (FIG. 3D), 2 dot pattern (FIG. 3C), 3 dot pattern (FIG. 3B), and 4 dot pattern [a] (FIG. 3A) are provided in the 2×2 of four pixels, as shown in FIGS. 3A to 3D. In the 2 dot pattern, four types of patterns [f]–[i] shown in FIG. 3C are provided, and in the 3 dot pattern, four types of patterns [b]–[e] shown in FIG. 3B are provided.

This algorithm is an error diffusion system where 2×2 or more pixels are one processing unit, and a most suitable pattern, comparing with the input pixels, is selected from the provided output patterns as output dots. The processing will now be described with reference to FIG. 2.

(S1) The address [x], [y] of the target pixel is initialized to "1".

(S2) It is judged whether "y" is the predetermined number of the vertical pixels or less. If "y" exceeds the number of vertical pixels, this processing ends.

(S3) It is judged whether "x" is the predetermined number of horizontal pixels or less. If "x" exceeds the number of horizontal pixels, processing advances to Step S10.

(S4) When the density level detection circuit 6 reads pixels in the 2×2 area of the input image from the address [x], [y], the average value IAVG (x, y) of the density level in that area is calculated by the equalization circuit 7.

$$IAVG(x,y)=\Sigma I[x+a,y+b]/4$$

(S5) A value I' (x, y) is calculated by adding the average value IAVG (x, y) and the quantization error E (x, y) diffused from the peripheral pixels.

(S6) The added value I' (x, y) and the threshold value T are compared, and an output pattern is selected. According to the template of an output pattern in the example in FIG. 3, the case when I' (x, y)<255/8 (the first threshold value T1) corresponds to FIG. 3A, and the output pattern at this time is (a). The case when 255/8<I' (x, y)<255*3/8 (the second threshold value T2) corresponds to FIG. 3B, and the output pattern at this time is one of (b)–(e).

The case when 255*3/8<I' (x, y)<255*3/4 (the third threshold value T3) corresponds to FIG. 3C, and the output pattern at this time is one of (f)–(i). And the case when I' (x, y)>255*3/4 corresponds to FIG. 3D, and the output pattern at this time is (j).

(S7) When the output pattern selected here is either the case of FIG. 3B or FIG. 3C, the input image and the output patterns are compared, and an output pattern matching the input image is determined from the output patterns. In other words, the density gradient in the corresponding 2×2 area in the input image is calculated, as shown in FIG. 4, and an output pattern which matches with the density gradient of the input pixels the most is selected. By selecting an output pattern adapting to the input pixels, the tone of an output image can be smoother and sharpness can be improved.

In the case of FIG. 3C, a further control is preferable. For example, if the pattern (g) of FIG. 3C is continuously output, a horizontal line pattern becomes outstanding in the output image, which deteriorates image quality. In order to prevent texture which is generated by repeating a certain pattern in this way, it is controlled so that the same patterns are not output continuously in the case of FIG. 3C. In this example, a pattern which is the second closest to the density gradient of the input is selected.

(S8) The [average density]-[output pattern] is calculated, then quantization error E [x, y] is determined, and this value is diffused to peripheral pixels.

(S9) "x" is incremented by two pixels and processing returns to Step S3.

(S10) "y" is incremented by two pixels and processing returns to Step S2.

In this way, the target pixel is shifted by two pixels in the horizontal direction. When all the main scanning processing ends, the target pixel is shifted by two pixels in the vertical direction. Then this operation is performed for all the pixels. In the case of a full color image, a similar operation is performed in each R, G, B (C, M, Y, K) plane.

Figure 5B:
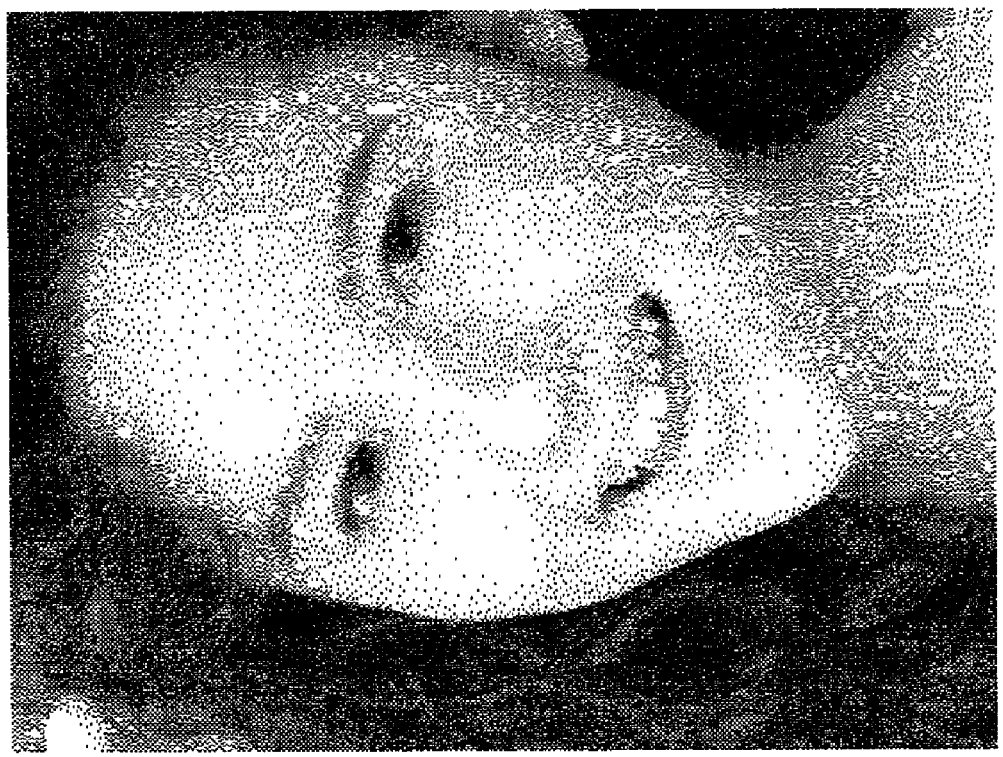
FIGS. 5A and 5B are diagrams depicting the output result by the image processing of the present invention.
Figure 5A:

FIG. 5 shows the output images obtained by this operation. FIG. 5A is an output image by systematic dither which is designed to prevent generation of isolated dots, and FIG. 5B is an output image by the present algorithm. Compared with the output pattern by the systematic dither method in FIG. 5A, the output result of the present invention in FIG. 5B does not have cyclic patterns and roundness of edges which are seen in the systematic dither method, and has smooth tone reproducibility, where reproducibility at detailed parts in particular have been improved.

In this way, the present invention is not a mere comparison operation with a matrix such as in the systematic dither method, but is an error diffusion algorithm which considers:

1. expanding the dynamic range to prevent jumps in the highlight part and darkening in the shadow part, 2. implementing smooth tone reproduction and edge enhancement by reflecting the density gradient of input pixels at output, and 3. density maintenance by diffusing quantization error to peripheral pixels. Therefore, the present invention does not have cyclic patterns and roundness of edges, which are seen in the systematic dither method, and has smooth tone reproducibility, where reproducibility in detail in particular have been improved.

Compared with the case when error diffusion processing is performed directly on normal 600 dpi, the number of times of an error diffusion operation to be performed is less. Processing time can therefore be decreased. As the number of times of operation decreases, the data volume to be diffused becomes less, and memory to be required also becomes less.

To implement this algorithm by discrete hardware, the circuit configuration of the functional blocks in FIG. 1 can be used, and to implement this algorithm by CPU and DSP software, a program to perform processing in FIG. 2 can be used.

SECOND EMBODIMENT

As a second embodiment, an embodiment with a 3×3 pattern will now be described. For example, an image is processed at 300 dpi using 900 dpi equipment.

Figure 6:
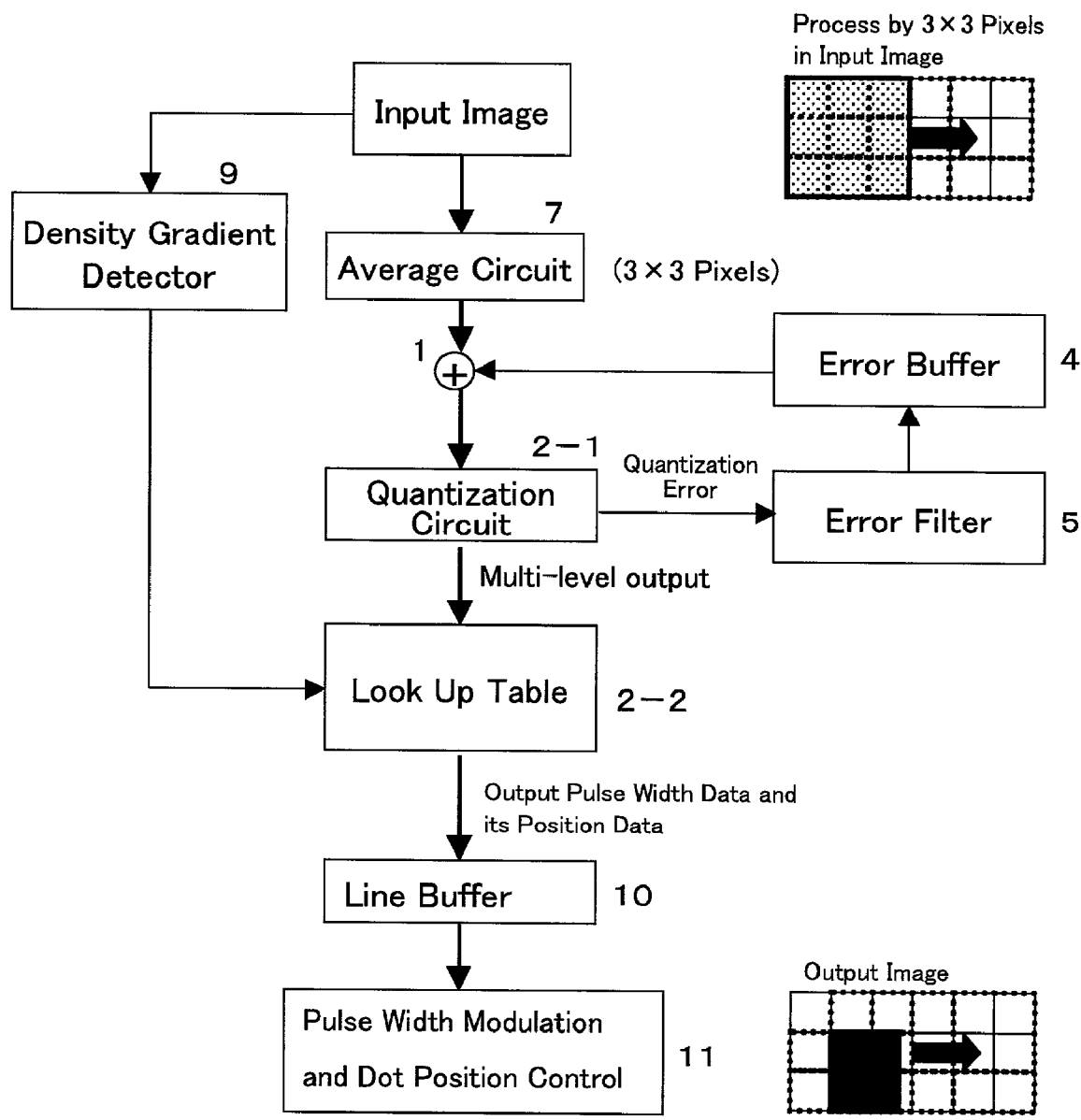
FIG. 6 is a functional block diagram depicting the second embodiment of the present invention.
Figure 7:
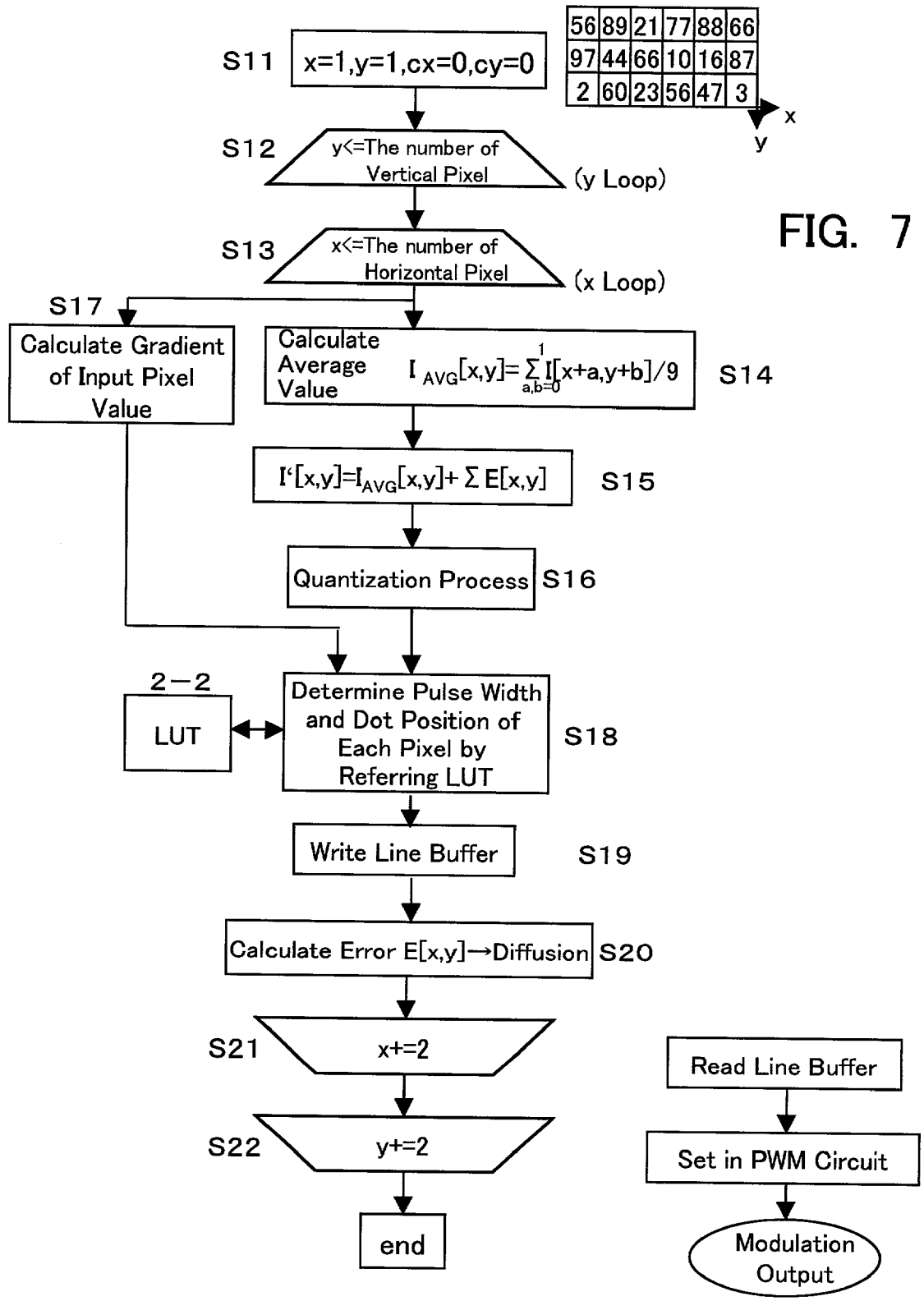
FIG. 7 is a processing flow chart of the second embodiment of the present invention.
Figure 8:
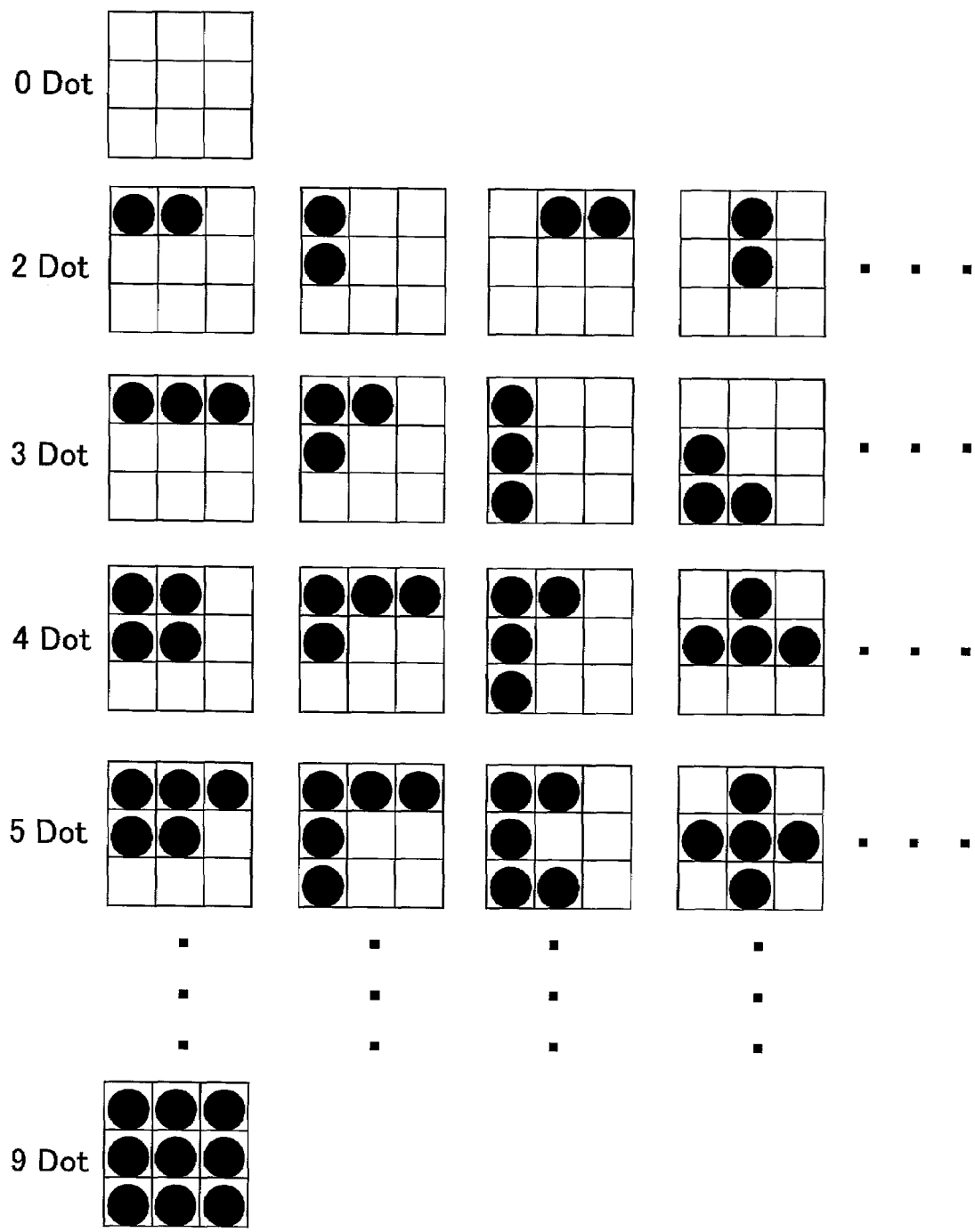
FIG. 8 is a diagram depicting the quantization pattern in FIG. 6.
Figure 9:
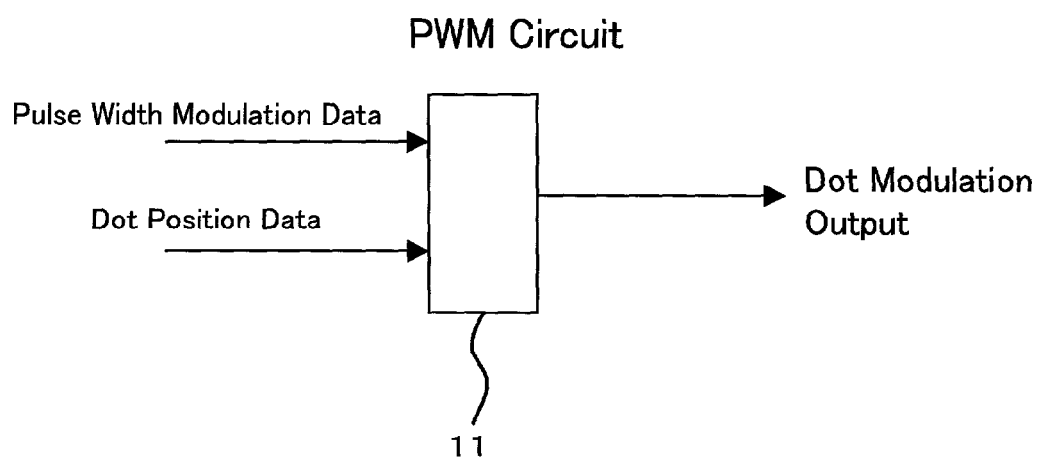
FIG. 9 is a diagram depicting the configuration of the pulse width modulation circuit in FIG. 6.
Figure 10:
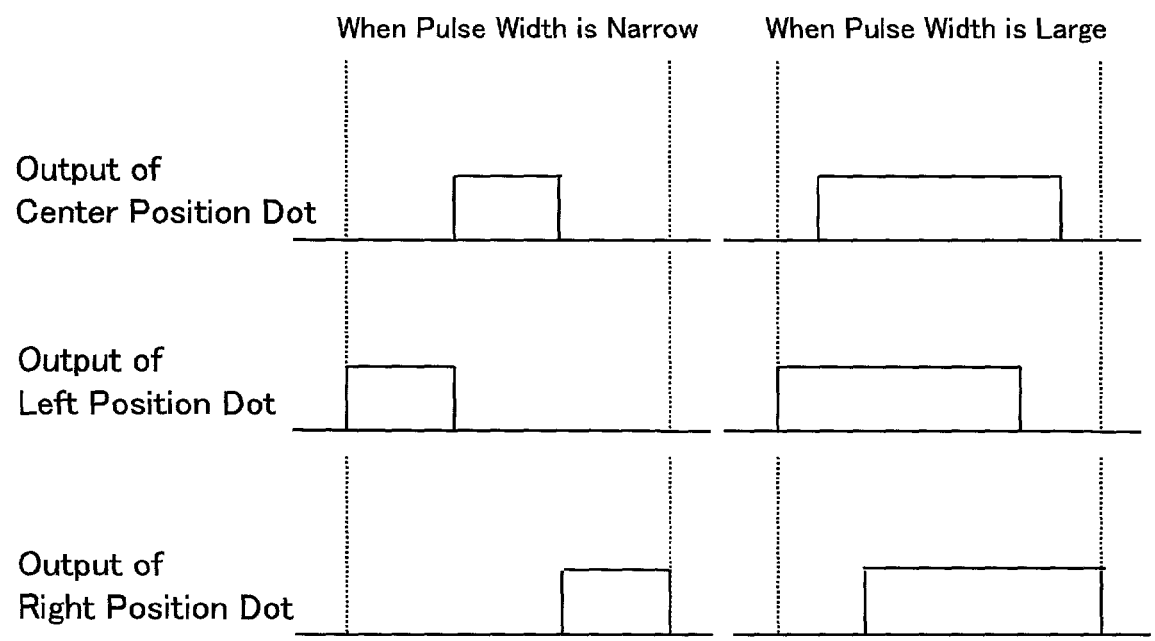
FIG. 10 is a diagram depicting the operation of the pulse width modulation circuit in FIG. 9.

FIG. 6 is a functional block diagram of the second embodiment of the present invention, FIG. 7 is a processing flow chart of the second embodiment of the present invention, FIG. 8 is a diagram depicting a 3×3 quantization pattern, FIG. 9 is a block diagram of a pulse width modulation circuit, and FIG. 10 is a diagram depicting operation of the pulse width modulation circuit.

In FIG. 6, identical parts as FIG. 1 are denoted by the same symbols. At first, the average value of the 3×3 pixel values is calculated by the equalization circuit 7 with the input image 3×3 as one processing unit. The adder 1 adds the average value and the diffusion error value. The quantization circuit 2-1 compares the added value and the threshold value, and performs 8-value quantization processing. In FIG. 8, quantization circuit 2-1 determines which level of 0 dot and 2 dots–8 dots will be output.

When the level to be output is determined, it is decided which pattern will be output using the LUT2-2 at that level. In the Look Up Table (LUT) 2-2, a table according to the input level and the gradient of the input pixels are stored, and data to indicate output pulse width and dot position is specified according to the applicable level and the gradient of the input image. Using this LUT2-2, the data is converted to multi-value output pulse data and position data, according to the gradient of density of the image and quantization output. As a result, higher resolution is implemented.

After conversion these values are written to the line buffer 10. The pulse width modulation data and the data position data are read from the line buffer 10, are input to the pulse width modulation circuit 11, and are processed.

In this embodiment, 3×3 pixels are equalized using points where image quality is balanced, and the number of pixels to be equalized differs depending on the resolution of the recording unit, the stability of the output density of the output device, the resolution of the input pixels, and the output speed of the recording unit.

The processing will now be described according to FIG. 7.

(S11) The address ⌈x⌋, ⌈y⌋ of the target pixel is initialized to "1".

(S12) It is judged whether "y" is the predetermined number of vertical pixels or less. If "y" exceeds the number of vertical pixels, this processing ends.

(S13) It is judged whether "x" is the predetermined number of horizontal pixels or less. If "x" exceeds the number of horizontal pixels, this processing ends.

(S14) Pixels in the 3×3 area of the input image are read from the address x, y, and the equalization circuit 7 calculates the average value IAVG (x, y) of the density level in that area.

$IAVG(x,y)=\Sigma I[x+a,y+b]/9$ (S15) A value I' (x, y) is calculated by adding the average value IAVG (x, y) and the quantization error E (x, y) diffused from the peripheral pixels.

(S16) The added value I' (x, y) and the threshold values T1–T8 are compared, and 8-value quantization processing is performed. In FIG. 8, it is determined which level of 0 dot and 2 dots–8 dots will be output.

(S17) The density gradient of the input pixels 3×3 is calculated.

(S18) Using LUT2-2, the level to be output is converted to multi-value output pulse width data and position data according to the gradient of the density of the image and quantization output. For the pattern selection procedure, the gradient of the pixel values of the input image is calculated and the pattern closest to the gradient is selected, just like the first embodiment. In this case as well, it is desirable not to output the same pattern continuously, so that texture does not appear.

(S19) After conversion these values are written to the line buffer 10. Pulse width modulation data and dot position data are read from the line buffer 10, are output to the pulse width modulation circuit 11, and are processed.

(S20) The quantization error, which is a difference between the average value of 3×3 pixels and the output value, is calculated and is diffused to the peripheral pixels.

(S21) "x" is incremented by three pixels and processing returns to Step S13.

(S22) "y" is incremented by three pixels and processing returns to Step S12.

This system adds the pulse width modulation circuit 11 in FIG. 9 after the error diffusion processing in the first embodiment. As FIG. 10 shows, detailed density can be reproduced and the result of error diffusion can be more accurately reflected in the output, as shown in FIG. 10.

Then the target pixel is shifted by three pixels and the same quantization processing is performed there. The above processing is performed on the entire image. According to this embodiment, the processing target is the 3×3 pixel group, so 8 tones, which is more than the case of 2×2, are output, and the processing time is shorter than the case of processing at 900 dpi.

THIRD EMBODIMENT

Figure 11:
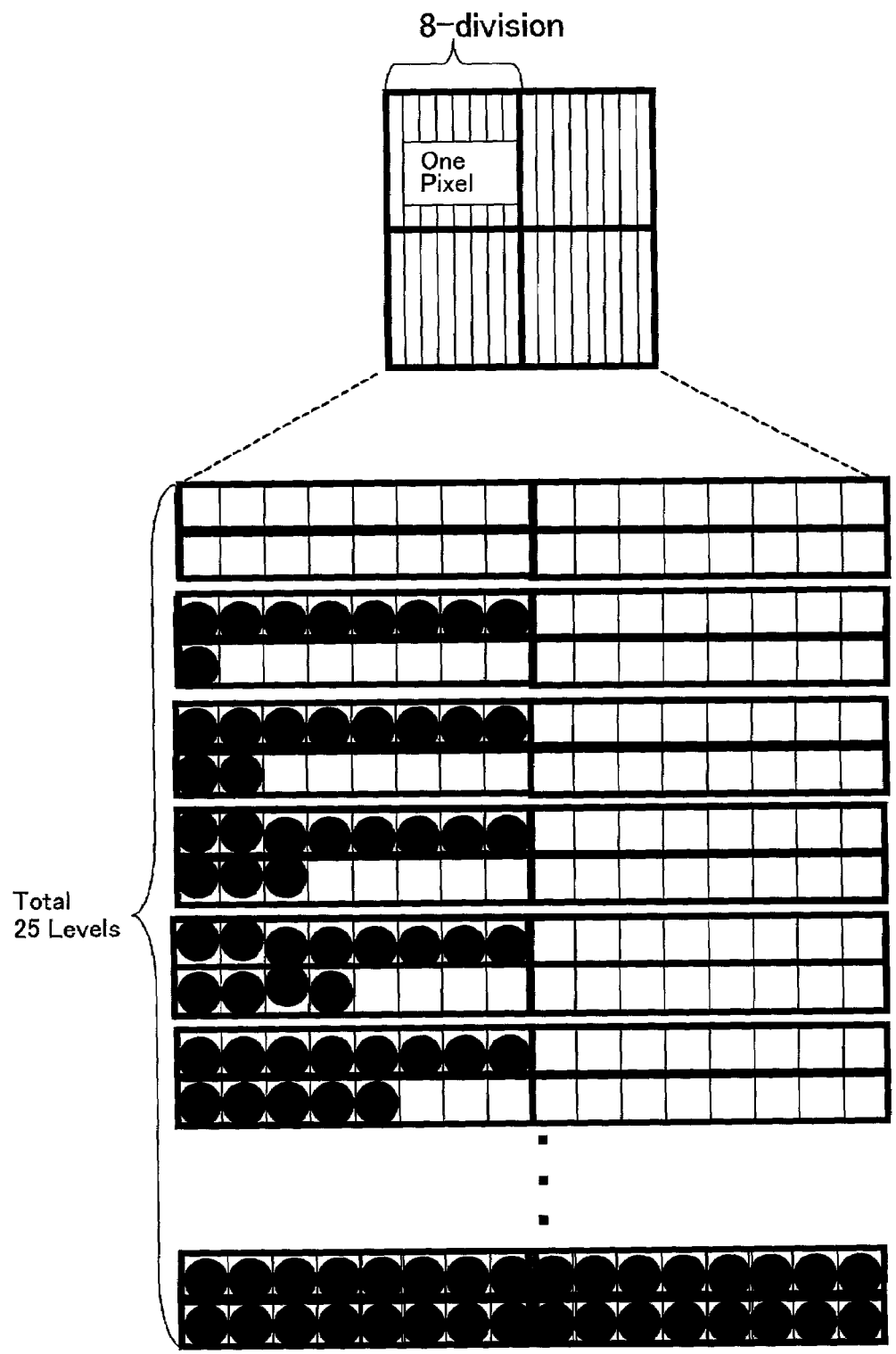
FIG. 11 is a diagram depicting the quantization pattern of the third embodiment of the present invention.

Now an embodiment for a 2×16 pattern will be described. FIG. 11 is a diagram depicting a part of a 2×16 pattern. Here a printer with a 600×4800 dpi resolution, which processes at 300 dpi, is considered. This printer cannot reproduce stable isolated dots at 600×600 dpi, but can reproduce dots at a resolution less than this.

For this printer to output one 600×600 dpi dot, one pixel is comprised of eight 600×4800 dpi minimum dots, as shown in FIG. 11. Eight or more minimum dots, where by dots can be generated stably, are used continuously. FIG. 11 shows an example of dot output in such a case. In this case, a total of 25 tones of representation are possible. Also, many types of patches can be set.

By this, a pattern closer to the gradient of the input image can be selected, and reproduction of the gradient improves. In this embodiment, error diffusion processing similar to the first and second embodiments is performed with the 2×16 pattern as one processing unit.

OTHER EMBODIMENTS

As the above embodiments show, the present invention can support any resolution. Depending on the image, not 300 dpi but such resolutions as 200 dpi or 150 dpi maybe used for processing. In this case, the number of operations can be less than those for 300 dpi, so faster processing can be implemented. The present invention can be applied not only to an electro-photography, but also to the image processing of other output devices.

Although the present invention has been described with the embodiments, various modifications are possible within the scope of the present invention, and these variant forms are not excluded from the technical scope of the present invention.

In the present invention, the error diffusion algorithm has flexibility in outputting dots. In other words, error diffusion processing is performed in N×M pixel units, and a plurality of quantization patterns are provided and a quantization pattern is selected based on the quantization result. Therefore, jumps in a highlight part and darkening in a shadow part can be prevented, the tone maintenance characteristic unique to the error diffusion can be satisfied, and a smooth and sharp image can be obtained.

What is claimed is:

1. An image processing method for performing image processing on input images using an error diffusion method, comprising:
    a step of calculating an average value of density values of N×M (N, M>1) pixels;
    a step of adding said average value and a diffused quantization error value;
    a step of quantizing said addition result by a predetermined number of tones;
    a step of selecting a quantization pattern corresponding to said quantization result;
    a step of calculating said diffused quantization error value from a quantization error;
    a step of calculating a density gradient of said N×M area; and
    a step of selecting a quantization pattern from said quantization result and said density gradient.

2. An image processing method for performing image processing on input images using an error diffusion method, comprising:
    a step of calculating an average value of density values of N×M (N, M>1) pixels;
    a step of adding said average value and a diffused quantization error value;
    a step of quantizing said addition result by a predetermined number of tones;
    a step of selecting a quantization pattern corresponding to said quantization result;
    a step of calculating said diffused quantization error value from a quantization error, wherein said selecting step comprises a step of selecting a quantization pattern corresponding to said quantization result from a plurality of quantization patterns which do not have an isolated dot.

3. An image processing method for performing image processing on input images using an error diffusion method, comprising:
    a step of calculating an average value of density values of N×M (N, M>1) pixels;
    a step of adding said average value and a diffused quantization error value;
    a step of quantizing said addition result by a predetermined number of tones;
    a step of selecting a quantization pattern corresponding to said quantization result;
    a step of calculating said diffused quantization error value from a quantization error; and
    a step of performing pulse width modulation on said quantization pattern.

4. An image processor for performing image processing on input images using an error diffusion method, comprising:
    a memory for storing said input images; and
    a processing unit for performing image processing on said input images, wherein said processing unit adds an average value of density values of N×M (N, M>1) pixels and
    a diffused quantization error value, quantizes said addition result with a predetermined number of tones, calculates the density gradient in said N×M area, selects a quantization pattern from said result and said density gradient quantization, and calculates said diffused quantization error value from a quantization error.

5. An image processor for performing image processing on input images using an error diffusion method, comprising:
    a memory for storing said input images; and
    a processing unit for performing image processing on said input images, wherein said processing unit adds an average value of density values of N×M (N, M>1) pixels and
    a diffused quantization error value, quantizes said addition result with a predetermined number of tones, selects quantization pattern corresponding to said quantization result from a plurality of quantization patterns which do not have an isolated dot, and calculates said diffused quantization error value from a quantization error.

6. An image processor for performing image processing on input images using an error diffusion method, comprising:
    a memory for storing said input images;
    a processing unit for performing image processing on said input images, wherein said processing unit adds an average value of density values of N×M (N, M>1) pixels
    a diffused quantization error value, quantizes said addition result with a predetermined number of tones, then selects a quantization pattern corresponding to said quantization result, and calculates said diffused quantization error value from a quantization error, and
    a pulse width modulation circuit which performs pulse width modulation on said quantization pattern.

7. A computer readable storage medium for storing a program to perform image processing on input images using an error diffusion method, wherein said program comprises:
    a program for calculating an average value of density values of N×M (N, M>1) pixels, and adding said average value and a diffused quantization error value;
    a program for quantizing said addition result with a predetermined number of tones, and selecting a quantization pattern corresponding to said quantization result;
    a program for calculating said diffused quantization error value from a quantization error; and
    a program for calculating the density gradient in said N×M area, and selecting a quantization pattern from said quantization result and said density gradient.

8. A computer readable storage medium for storing a program to perform image processing on input images using an error diffusion method, wherein said program comprises:

a program for calculating an average value of density values of N×M (N, M>1) pixels, and adding said average value and a diffused quantization error value;

a program for quantizing said addition result with a predetermined number of tones, and selecting a quantization pattern corresponding to said quantization result;

a program for calculating said diffused quantization error value from a quantization error; and a program for selecting a quantization pattern corresponding to said quantization result from a plurality of quantization patterns which do not have an isolated dot.

9. A computer readable storage medium for storing a program to perform image processing on input images using an error diffusion method, wherein said program comprises:

a program for calculating an average value of density values of N×M (N, M>1) pixels, and adding said average value and a diffused quantization error value;

a program for quantizing said addition result with a predetermined number of tones, and selecting a quantization pattern corresponding to said quantization result;

a program for calculating said diffused quantization error value from a quantization error; and a program for performing pulse width modulation on said quantization pattern.

* * * * *